United States Patent
Mörz

[11] Patent Number: 5,810,529
[45] Date of Patent: Sep. 22, 1998

[54] DEVICE FOR RECEIVING WORKPIECES

[75] Inventor: Fridolin Mörz, Wolfertschwenden, Germany

[73] Assignee: Haff & Schneider GmbH & Co. OHG, Nesselwang, Germany

[21] Appl. No.: 774,613

[22] Filed: Dec. 30, 1996

[30]  Foreign Application Priority Data

Feb. 24, 1996 [DE] Germany .................. 296 03 371.5
Feb. 24, 1996 [DE] Germany .................. 296 03 370.7

[51] Int. Cl.⁶ ............................................. B23D 7/08
[52] U.S. Cl. ................ 409/222; 74/813 L; 74/813 R; 409/224
[58] Field of Search .................. 74/813 L, 813 R; 414/222; 409/221, 222, 223, 224

[56]  References Cited

U.S. PATENT DOCUMENTS

| | | | |
|---|---|---|---|
| 2,565,787 | 8/1951 | Tennant | 409/222 |
| 2,704,672 | 3/1955 | Wiltsie et al. | 74/813 |
| 2,877,691 | 3/1959 | Shurina | 409/222 |
| 3,336,823 | 8/1967 | Bonzi | 409/221 |
| 3,380,322 | 4/1968 | Brault | 409/221 |
| 3,908,484 | 9/1975 | Degen et al. | 409/222 |
| 3,965,775 | 6/1976 | Pinkesfeld | 74/813 R |
| 4,050,355 | 9/1977 | Niskanen | 409/221 |
| 4,575,291 | 3/1986 | Babel | 409/222 |
| 4,617,720 | 10/1986 | Palfery et al. | 409/221 |
| 4,807,338 | 2/1989 | Myles | 29/38 C |

*Primary Examiner*—A. L. Pitts
*Assistant Examiner*—Christopher Kirkman
*Attorney, Agent, or Firm*—Jones, Tullar & Cooper, P.C.

[57]  ABSTRACT

In connection with a device for receiving workpieces, in particular for machine tools with continuous-path control, preferably numerically controlled machine tools, a dividing mechanism having a dividing spindle, which is seated in a housing, can be brought into predetermined angular positions and is connected with a workpiece holder. It is possible to achieve an exact and rapid setting of the dividing mechanism in that it is arranged for actuation by means of a continuous-path-controlled actuator, by which an indexing mechanism associated with the dividing spindle, with whose aid the dividing spindle can be locked in place in a predeterminable angular position, can be brought into a position which releases the dividing spindle, and through which the dividing spindle can be rotated.

19 Claims, 2 Drawing Sheets

DEVICE FOR RECEIVING WORKPIECES

FIELD OF THE INVENTION

The present invention relates to a device for receiving workpieces, in particular for machine tools with continuous-path control, preferably numerically controlled machine tools.

BACKGROUND OF THE INVENTION

Devices of the noted type with a dividing mechanism having a dividing spindle, which is seated in a housing, which can be brought into predetermined angular positions, and which is connected with a workpiece holder are accessories to machine tools. As a rule, the dividing mechanism is used to position the workpieces in defined angular positions for subsequent processing or to bring different chucking planes into the work area of the processing tool. With conventional dividing mechanisms, positioning is performed either manually or by separate actuators at the dividing mechanism itself. However, dividing mechanisms with their own actuator are very elaborate because of the additional drive and control elements. The result is that they take up a large structural space. Manual operation has a disadvantageous effect on the achievable degree of automation and the achievable accuracy.

OBJECT AND SUMMARY OF THE INVENTION

Based on the foregoing, it is an object of the present invention to provide a device of the type mentioned at the outset, which can operate without its own actuator and yet does not need to be operated manually.

This object is achieved in accordance with the present invention in that the dividing mechanism is designed for actuation by means of a continuous-path-controlled actuator, through which an indexing mechanism assigned to the dividing spindle can be arrested in a predeterminable angular position, can be brought into a position to release the dividing spindle and by means of which the dividing spindle can be rotated.

These steps assure that it is possible to perform all release, positioning and locking actions without separate drives, while making use of the controlled displacement movements of the actuator. The actuator can be simply coupled with the machine tool which has a continuous-path control. Thus the dividing process can be performed while using the controlled displacement movements of the machine tool, so that practically no further outlay is created. In this way the dividing process can be performed in an advantageous manner by using a program control of the machine tool, without the need for individual drive and control elements with the corresponding electrical and hydraulic feed lines on the dividing mechanism. It is possible in this way to considerably reduce the number of the required components and therefore also the size of the dividing mechanism. Since no energy feed lines are necessary for the dividing mechanism, the device in accordance with the present invention is also suitable for employment with machine tools having pallet changers. In this case two devices in accordance with the present invention can be advantageously used, which are arranged on pallets which can be retracted into and extended from the machine tool in the course of changes. While the one device is in use, the other device can be prepared outside of the machine tool, i.e. outfitted with tools, because of which the idle time of the machine tool can be considerably shortened. Accordingly, the steps in accordance with the present invention result in an excellent overall efficiency.

The indexing mechanism can be suitably actuated by means of a slider arrangement disposed in the housing, which can be displaced against the force of at least one restoring spring by means of the actuator. In this way it is assured that the actuator only needs to transfer pressure forces to the slider arrangement, which can take place via a simple pressure contact. In an advantageous manner, no interlocking coupling for the transfer of tension forces is required.

Another advantageous step can consist in the indexing mechanism having an interlocking element, which can engage teeth fixed on the housing and corresponding teeth on the dividing spindle. By means of this an exact angular division, even with small and very small dividing steps, as well as chucking of the dividing spindle in a manner free of play in the respectively desired angular position, is made possible.

In connection with this, the interlocking element can be designed as a toothed wheel segment, which can be pressed into the teeth fixed on the housing and the teeth on the dividing spindle, extends over the associated teeth, and which has a counter-contour matched to the associated teeth. In this case the smallest dividing step corresponds to the distance between two teeth. In the engaged position, several teeth of the gear wheel segment are in engagement with the associated teeth of the housing and the dividing spindle in an advantageous manner, by means of which it is not only possible to transmit large forces, but also to reduce division errors to the greatest extent. In an advantageous manner, the recited steps also result in a very tight frictional engagement, which also has an advantageous effect on the accuracy which can be achieved.

In a further development, the slider arrangement, which is preferably arranged in an axially displaceable manner, can have two elements provided with tapered faces, which cooperate with associated tapered faces attached to the interlocking element, for the engagement and disengagement of the interlocking element. By means of this it is assured that the interlocking element can be arranged free of play between the elements of the slider arrangement provided with tapered faces, which assures a high degree of accuracy and dependability.

A further advantageous step can consist in associating at least one thrust bolt with the slider arrangement. The thrust bolt is disposed in an associated recess of the dividing spindle, can be caused to rest against an associated thrust member of the slider arrangement, and cooperate with a restoring spring arrangement. It can be axially displaceable by means of the actuator and, for rotating the dividing spindle, engages the recess associated with it. By placing the actuator against the thrust bolt, the indexing mechanism is then disengaged and vice versa. It is simultaneously possible by means of the actuator placed against the thrust bolt to perform the rotation of the dividing spindle, so that intermediate steps can be omitted in an advantageous manner.

The tapered face of the interlocking element provided for engagement with the interlocking element can be advantageously placed in the center in relation to the teeth in the housing and the dividing spindle. The result is a largely even force distribution on the two associated sets of teeth by means of the interlocking element.

A further practical step can consist in that an actuator for manual operation is disposed on the slider arrangement, which can be extended from the housing through a recess associated with the housing. This step permits the simple manual outfitting, outside of a continuous-path-controlled machine tool, of a workpiece holder with several chucking planes.

Further advantageous embodiments and practical further developments of the higher-order steps are possible and ensue from the following description of an example by means of the drawings described below.

DETAILED DESCRIPTION OF THE PREFERRED EMBODIMENT

Figure 1:
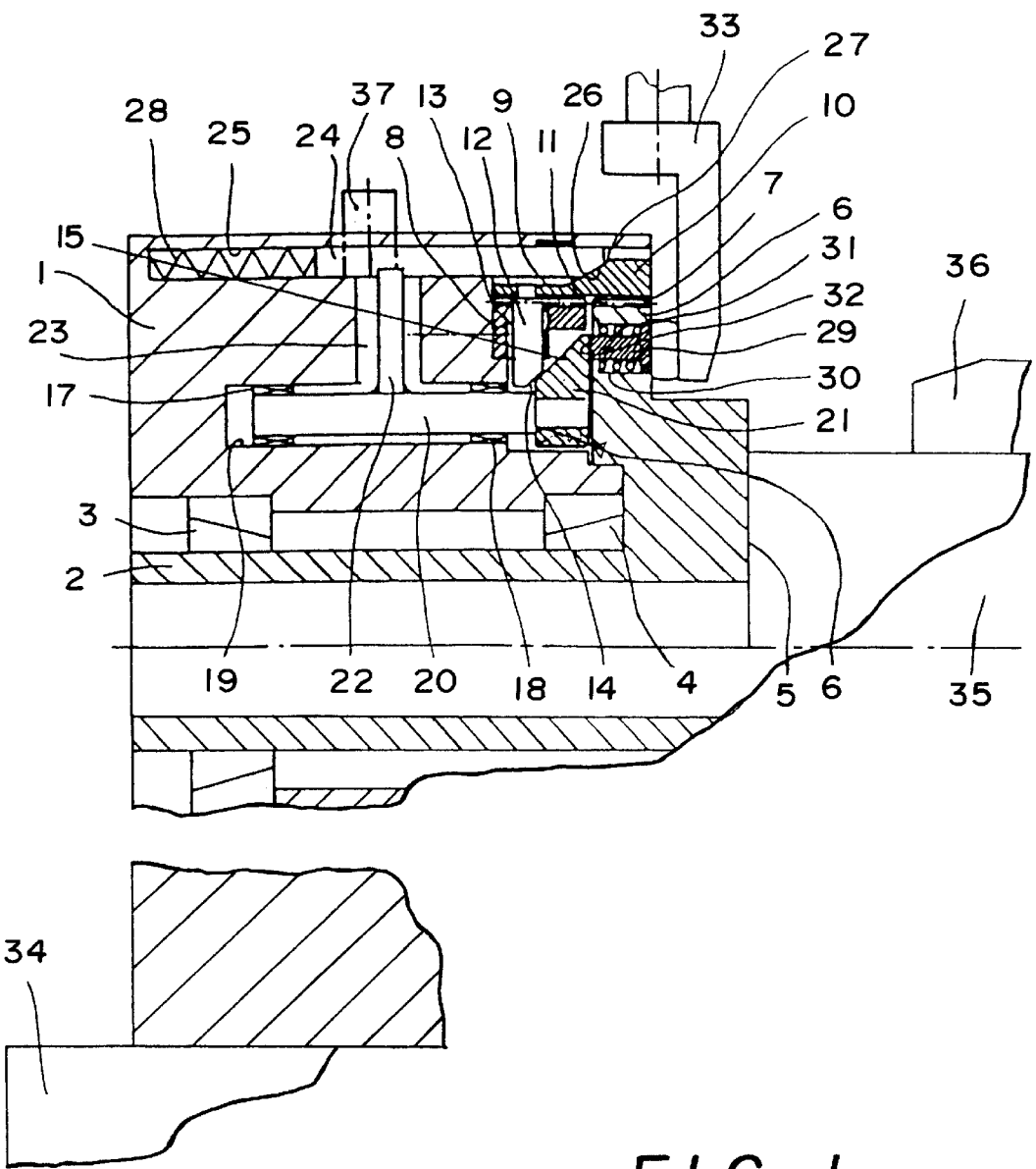
FIG. 1 is a schematic lateral view, partially in section, of a device in accordance with the present invention.
Figure 2:
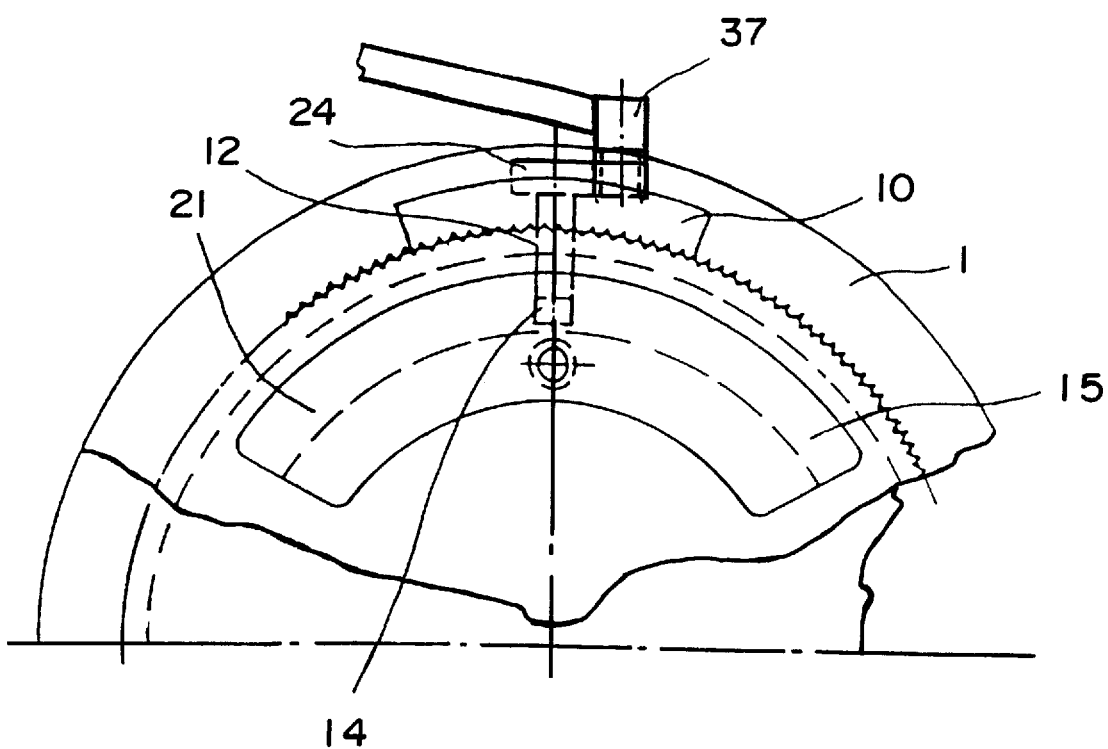
FIG. 2 is a schematic front view of the upper portion of the arrangement of FIG. 1.

The device shown in FIGS. 1 and 2 can be received on a tool table 34 of a machine tool, for example a numerically controlled milling machine. The device has a workpiece holder 35 in which workpieces 36, which are to be processed by means of the machine tool, can be received, and a dividing mechanism associated with the workpiece holder 35, by means of which the workpiece holder 35 can be rotated through a predeterminable angle and fixed in place in a predeterminable angular position. This permits the working of the workpieces 36 on several sides or, when one side is worked, the use of a workpiece holder 35 with several chucking planes.

The above mentioned dividing mechanism has a housing 1, in which a dividing spindle 2 is rotatably seated by means of tapered roller bearings 3, 4. The workpiece holder 35 can be fixed in place on the front surface 5 of the dividing spindle 2, which projects outward from the housing 1. The holder can be, for example, a chuck, a point for clamping between points in connection with a tailstock or, as in the represented example, a chucking table with several chucking planes. The housing 1 has support elements on at least one outer surface, by means of which it can be fixed in place on the tool table 34. When using a long workpiece holder 35, it is possible to provide a pedestal opposite the housing 1 for supporting the end of the workpiece holder 35 remote from the housing. In this case the housing 1 and the possibly provided pedestal can be received on a common base plate, which is clamped on the tool table 34.

The dividing spindle 2 has an element 6 which is widened in the manner of a disk, on whose outer circumference teeth 7 are provided. A toothed ring 8, fixed against relative rotation on the housing, or a segment thereof with outer teeth 9 corresponding to the teeth 7, is located next to the disk-shaped element 6. The toothed ring 8 or the toothed-ring segment are arranged in such a way that the reference circle of its outer teeth 9 is coaxial with and has the same diameter as the reference circle of the teeth 7 on the dividing spindle 2.

A radially displaceable interlocking element 10 extends over the two sets of teeth 7 and 9, and, for providing locking, is pressed into the two sets of teeth 7 and 9, and is released for unlocking. Accordingly, the sets of teeth 7 and 9 and the interlocking element 10 constitute an indexing mechanism for the exact mutual fixing in place of the sets of teeth 7, 9, or of the elements in the form of the housing 1 and the dividing spindle 2 connected therewith. As a toothed ring segment with teeth on the inside, the interlocking element 10 is embodied with inner teeth 11 matched to the outer teeth 9 and the teeth 7 on the dividing spindle 2. A radially extending guide pin 12, which is radially displaceably guided in a transverse bore 13 fixed on the housing, is disposed on the inside of the interlocking element 10 for guiding the latter. In the embodiment shown, the transverse bore 13 is located in a portion without teeth of the toothed ring or toothed-ring segment 8. It is also possible to insert a sliding bushing into the transverse bore 13, in which the guide pin 12 is displaceably guided.

On its inner free end the guide pin 12 has a tapering face 14, which cooperates with a taper 15 on a pressure element 21 of a slider 16, which is axially movable in the housing 1. In the locked position, the tapering face 14 does not exert a pressure on the taper 15 or is located at a distance therefrom. The slider 16 contains a bolt 20, which is displaceably guided in a longitudinal bore 19 in the housing 1 via spherical bushings 17 and 18, and a pressure element 21 in the shape of a segment of a ring, disposed on its outer end. The taper 15 is located on the pressure element 21 for engagement with the tapering face 14. A transverse pin 22 is fastened on the bolt 20 between the spherical bushings 17 and 18. The pin 21 projects with an axial degree of freedom of movement through a recess 23 in the housing 1 extending crosswise with respect to the longitudinal bore 19, and which is connected with an axially movable tapered slider 24 disposed radially outside the bolt 20. Accordingly, the slider 16 and the tapered slider 24 rigidly connected therewith constitute a uniformly displaceable double slider arrangement.

The tapered slider 24 is displaceably guided in a recess 25 in the housing 1 which is parallel with the axis of rotation of the dividing spindle 2, and on its end facing the interlocking element 10 has a tapered face 26. The latter cooperates with a tapered face 27 on the outside of the interlocking element 10. A pressure spring 28 acts on the other end of the tapered slider 24, and which acts on the tapered slider 24 in the direction toward the interlocking element 10.

Four thrust bolts 29, which are arranged at the same distance from the dividing spindle axis at the same angles with respect to each other, are disposed axially movable in corresponding bores 30 in the disk-shaped element 6 of the dividing spindle 2. A locking ring, not represented here, can be provided at the inner end of the thrust bolts 29 which, in the locked position of the dividing mechanism, rests against the inner front face of the disk-shaped element 6 and prevents the falling out of the associated thrust bolts 29. The thrust bolts 29 are each acted upon toward the exterior by a spring 31. The inward facing front face 32 of each of the thrust bolts 29 has a configuration which is suitable for resting against the pressure element 21. The thrust bolts 29 have a widened head, whose outer front face is flush with the outer plane face of the disk-shaped element 6 in the locked position of the dividing mechanism.

The dividing mechanism can be coupled with an actuator 33, which has been inserted into a processing spindle, which can be displaced along several axes, of the machine tool, and which suitably is a numerically controlled machine tool, or is fastened on its processing unit which can be displaced along several axes.

The actuator 33 is suitably inserted the same as a tool by means of a tool changer. The actuator has a pin, which can be brought into engagement with one of the thrust bolts 29 and which suitably can enter with a degree of freedom of rotation into the bore 30 associated with the thrust bolt 29.

The dividing process takes place as follows:

The actuator 33 is moved by means of the machine control to one of the thrust bolts 29 and pushes it inward. In the process, the front face 32 of the spring-loaded thrust bolt 29 facing inward pushes against the ring-segment-shaped pressure element 21 and thus pushes the slider 16 together with the bolt 20 axially inward. By means of this, the taper 15 of the pressure piece 21 comes to rest against the tapering face 14 of the guide pin 12 and pushes it, together with the interlocking element 10, radially outward.

Simultaneously with the displacement of the bolt 20, the tapered slider 24, which is rigidly connected with it by means of the transverse pin 22, is displaced and in the process releases the interlocking element 10 for radial outward displacement. By means of the displacement of the interlocking element 10 toward the exterior, its inner teeth 11 are simultaneously taken out of engagement with the teeth 9 fixed on the housing and with the teeth 7 on the dividing spindle 2. This action unlocks the dividing spindle 2.

Subsequently the actuator 33 moves into a desired angular position along an arc of a circle with a radius corresponding to the distance of the thrust bolt axis from the dividing spindle axis, in the course of which the dividing spindle 2 is taken along and thereby correspondingly turned and is brought into the desired angular position. In the course of turning of the dividing spindle 2, the front face 32 of the thrust bolt 29 continues to slide on the ring-segment-shaped pressure element 21, so that the interlocking element 10 is taken out of engagement with the teeth 7, 9, as a result of which the dividing spindle 2 remains unlocked.

After reaching the desired position, the actuator 33 moves back. In the process the thrust bolt 29 is pushed into its starting position by the spring 31. The slider 16, which is pressed against the front face 32 of the thrust bolt 29 by means of the pressure spring 28, and the tapering slider 24 rigidly connected with it, also perform this axial movement, so that the interlocking element 10 is simultaneously pressed by the tapering slider 24 into the teeth 9 fixed on the housing and the teeth 7 on the dividing spindle and thus connects them free of play.

In the exemplary embodiment shown, a maximal pivot of approximately 120° can be achieved per engagement of the actuator 33 with the dividing spindle 2. Therefore this embodiment is particularly suited for use of the dividing mechanism where the dividing spindle 2 is horizontally disposed on a workpiece, since in this case the displacement possibility of the actuator 33 is limited by the workpiece table. For pivot movements of more than 120° it is then necessary to move the actuator 33 to the next thrust bolt 29, and a fresh positioning process must be performed.

However, the present invention is not limited to the exemplary embodiment represented here. For example, the ring-segment-shaped pressure element 21 can also be designed as a complete ring. Thus, when using a dividing mechanism with a vertically arranged dividing spindle, it is possible to perform a 360° turn without resetting the actuator 33.

Outfitting of the workpiece holder 35 with the workpieces 36 suitably takes place outside the machine tool. The same applies for unloading. By means of this it is possible to save idle time. In order to be able to manually unlock the dividing mechanism outside of the machine tool, an actuating element 37, which is movable out of the housing 1 through an appropriate recess of the latter and is provided with a handle, is attached to the slider arrangement, suitably at the radially outer tapering slider 24. To make manual use of the dividing mechanism easier, a scale cooperating with a marker can be provided. The disk-shaped element 6 of the dividing spindle is suitably embodied as a support for the scale which cooperates with a marker on the side of the housing.

The device outfitted with not-yet-processed workpieces is suitably brought into the machine tool in alternation with a device supporting already processed workpieces. The machine tool is suitably provided with a pallet changer for this purpose.

What is claimed is:

1. A device for receiving workpieces of continuous-path control machines having a continuous-path controlled actuator, the device comprising:

a housing;

a dividing mechanism mounted in said housing, said dividing mechanism having a dividing spindle and an indexing mechanism;

a workpiece holder connected to said dividing mechanism;

a slider arrangement mounted in said housing; and a restoring spring engageable with said slider arrangement, wherein:

said slider arrangement is mounted between said restoring spring and said indexing mechanism and applies the force of said restoring spring against said indexing mechanism, said slider arrangement being displaced by the continuous-path controlled actuator, and said indexing mechanism is operatively associated with said dividing spindle and the continuous-path controlled actuator for locking said dividing spindle in a predetermined angular position and for releasing said dividing spindle to permit rotation of said dividing spindle.

2. The device of claim 1, wherein:

said indexing mechanism has an interlocking element, said interlocking element defining tapered faces, and said slider arrangement has two elements provided with tapered faces which cooperate with the tapered faces of said interlocking element for the engagement and disengagement of said interlocking element.

3. The device of claim 1, further comprising:

an axially displaceable further slider arrangement defining a pressure element;

at least one thrust bolt; and a corresponding restoring spring, wherein:

said dividing spindle defines a recess within which said thrust bolt and said corresponding restoring spring are disposed, and said thrust bolt being brought into contact with said pressure element by the continuous-path controlled actuator and against the force of said corresponding restoring force.

4. The device of claim 3, wherein:

a plurality of thrust bolts and corresponding restoring springs are provided arranged at equal distances from the axis of said dividing spindle and offset with respect to each other in the circumferential direction about said housing, said dividing spindle defines a plurality of recesses within which a respective one of said plurality of thrust bolts and corresponding restoring springs are disposed, and said slider arrangement includes a pressure element which is one of ring-shaped and ring-segment shaped, and which is engaged by said thrust bolts.

5. A device for receiving workpieces of continuous-path control machines having a continuous-path controlled actuator, the device comprising:

a housing;

a dividing mechanism mounted in said housing, said dividing mechanism having a dividing spindle and an indexing mechanism; and a workpiece holder connected to said dividing mechanism, wherein:

said indexing mechanism being operatively associated with said dividing spindle and the continuous-path controlled actuator for locking said dividing spindle in a predetermined angular position and for releasing said dividing spindle to permit rotation of said dividing spindle, said housing has teeth defined thereon and said dividing spindle has teeth defined thereon, said indexing mechanism has an interlocking element with teeth defined thereon, which engage the teeth of said housing and said dividing spindle, and said teeth defined on said interlocking element having a counter-contour to those defined on said housing and said dividing spindle.

6. The device of claim 5, further comprising:

a transverse pin which extends through a recess in said housing with a degree of axial displacement freedom;

a radial guide pin mounted in said housing and extending through the teeth defined on said housing, said radial guide pin defining a tapered face; and a further slider arrangement which defines a tapered face, wherein:

said interlocking element defines a tapered face which faces away from the tapered face of said radial guide pin and that of said further slider arrangement, said tapered faces being radially offset with respect to each other, and said transverse pin serving to connect said slider arrangements.

7. The device of claim 6, wherein:

the teeth on said housing and the teeth on said dividing spindle are arranged to be next to each other and to have the same diameter, and said interlocking element is arranged to be centered with respect to the teeth on said housing and the teeth on said dividing spindle.

8. The device of claim 7, wherein:

the teeth on said housing and the teeth on said dividing spindle are identical outer teeth, and said interlocking element defines teeth which are inner teeth and extend over and engage the teeth on said housing and those on said dividing spindle.

9. The device of claim 6, further comprising:

a manually operable actuating element which extends out of said housing and is connected to one of said slider arrangements.

10. A device for receiving workpieces of continuous-path control machines having a continuous-path controlled actuator, the device comprising:

a housing;

a dividing mechanism mounted in said housing, said dividing mechanism having a dividing spindle and an indexing mechanism;

a workpiece holder connected to said dividing mechanism; and a continuous-path controlled actuator operatively associated with said dividing spindle and said indexing mechanism for locking said dividing spindle in a predetermined angular position and for releasing said dividing spindle from its locked position to permit rotation of said dividing spindle by operating on said indexing mechanism.

11. The device of claim 10, further comprising:

a slider arrangement mounted in said housing; and a restoring spring engageable with said slider arrangement, wherein:

said slider arrangement is mounted between said restoring spring and said indexing mechanism and applies the force of said restoring spring against said indexing mechanism, said slider arrangement being displaced by said continuous-path controlled actuator.

12. The device of claim 11, wherein:

said indexing mechanism has an interlocking element, said interlocking element defining tapered faces, and said slider arrangement has two elements provided with tapered faces which cooperate with the tapered faces of said interlocking element for the engagement and disengagement of said interlocking element.

13. The device of claim 11, further comprising:

an axially displaceable further slider arrangement defining a pressure element;

at least one thrust bolt; and a corresponding restoring spring, wherein:

said dividing spindle defines a recess within which said thrust bolt and said corresponding restoring spring are disposed, and said thrust bolt being brought into contact with said pressure element by said continuous-path controlled actuator and against the force of said corresponding restoring force.

14. The device of claim 13, wherein:

a plurality of thrust bolts and corresponding restoring springs are provided arranged at equal distances from the axis of said dividing spindle and offset with respect to each other in the circumferential direction about said housing, said dividing spindle defines a plurality of recesses within which a respective one of said plurality of thrust bolts and corresponding restoring springs are disposed, and said slider arrangement includes a pressure element which is one of ring-shaped and ring-segment shaped, and which is engaged by said thrust bolts.

15. The device of claim 10, wherein:

said housing has teeth defined thereon and said dividing spindle has teeth defined thereon, said indexing mechanism has an interlocking element with teeth defined thereon, which engage the teeth of said housing and said dividing spindle, and said teeth defined on said interlocking element having a counter-contour to those defined on said housing and said dividing spindle.

16. The device of claim 15, further comprising:

a transverse pin which extends through a recess in said housing with a degree of axial displacement freedom;

a radial guide pin mounted in said housing and extending through the teeth defined on said housing, said radial guide pin defining a tapered face; and a further slider arrangement which defines a tapered face, wherein:

said interlocking element defines a tapered face which faces away from the tapered face of said radial guide pin and that of said further slider arrangement, said tapered faces being radially offset with respect to each other, and said transverse pin serving to connect said slider arrangements.

17. The device of claim 16, wherein:

the teeth on said housing and the teeth on said dividing spindle are arranged to be next to each other and to have the same diameter, and said interlocking element is arranged to be centered with respect to the teeth on said housing and the teeth on said dividing spindle.

18. The device of claim 17, wherein:

the teeth on said housing and the teeth on said dividing spindle are identical outer teeth, and said interlocking element defines teeth which are inner teeth and extend over and engage the teeth on said housing and those on said dividing spindle.

19. The device of claim 16, further comprising:

a manually operable actuating element which extends out of said housing and is connected to one of said slider arragements.

\* \* \* \* \*